United States Patent [19]
Nielsen

[11] Patent Number: 5,875,443
[45] Date of Patent: Feb. 23, 1999

[54] INTERNET-BASED SPELLING CHECKER DICTIONARY SYSTEM WITH AUTOMATIC UPDATING

[75] Inventor: Jakob Nielsen, Atherton, Calif.

[73] Assignee: Sun Microsystems, Inc., Mountain View, Calif.

[21] Appl. No.: 593,613

[22] Filed: Jan. 30, 1996

[51] Int. Cl.⁶ .................................................. G06F 17/30
[52] U.S. Cl. ................................ 707/2; 707/10; 707/532; 707/533
[58] Field of Search ..................................... 395/795, 610, 395/608, 615; 707/8, 10, 103, 104, 2, 533, 532

[56] References Cited

U.S. PATENT DOCUMENTS

| | | | |
|---|---|---|---|
| 4,855,906 | 8/1989 | Burke ....................................... | 364/200 |
| 5,146,561 | 9/1992 | Carey et al. ............................. | 395/200 |
| 5,189,610 | 2/1993 | Kaplan et al. ........................... | 364/419 |
| 5,459,862 | 10/1995 | Garliepp et al. ....................... | 395/600 |
| 5,493,728 | 2/1996 | Solton et al. ........................... | 395/250 |
| 5,581,749 | 12/1996 | Hossain et al. ......................... | 395/600 |
| 5,592,661 | 1/1997 | Eisenberg et al. ..................... | 395/600 |
| 5,604,897 | 2/1997 | Travis ..................................... | 395/795 |
| 5,606,693 | 2/1997 | Nilsen et al. ........................... | 395/610 |
| 5,625,818 | 4/1997 | Zarmer et al. .......................... | 395/615 |
| 5,706,365 | 1/1998 | Rangarajan et al. .................... | 382/230 |

FOREIGN PATENT DOCUMENTS 0 788 062    6/1997    European Pat. Off. .

OTHER PUBLICATIONS

"Using Framemaker: X Window System," Frame Technology Corporation, pp. 9/1–9/18, Sep. 1993.

First Virtual Holdings Incorporated, *Information on the First Virtual Internet Payment System*, 1995.

*Primary Examiner*—Thomas G. Black
*Assistant Examiner*—Michael J. Wallace, Jr.
*Attorney, Agent, or Firm*—Beyer & Weaver LLP

[57] ABSTRACT

A dictionary system has a vendor computer and a plurality of client computers that communicate through the Internet. Each client computer has a word processor program with a spelling checker that utilizes a local main dictionary provided by the vendor and a local customized dictionary containing words added by the user. The vendor computer contains a dictionary of approved words, a database of misspelled words, and a database of requested words. When a user adds a new word to the local customized dictionary, an Internet request is sent to the vendor computer to add the new word to the dictionary of approved words. The user is notified by an Internet message from the vendor computer if the requested word is misspelled. The database of requested words from all users is reviewed periodically and utilized to update the approved dictionary. The updated dictionary is periodically released to the users as an upgrade to the local main dictionary. Users are compensated for the words that they contribute to the approved dictionary.

37 Claims, 7 Drawing Sheets

INTERNET-BASED SPELLING CHECKER DICTIONARY SYSTEM WITH AUTOMATIC UPDATING

BACKGROUND OF THE INVENTION

1. Field of the Invention

This invention pertains generally to spelling checker dictionaries for computer-based word processing programs and other text-handling applications, and more particularly to network-based dictionaries and techniques for updating such dictionaries to add new words based on information provided by users of the programs.

2. Description of the Background Art

Word processing programs for computers generally include a system for allowing the user to check the spelling in the text that is being processed. Users of such programs occasionally make spelling mistakes unknowingly when writing text, and text that is created externally and imported into the computer for further word processing may also contain misspelled words, of which the user may be unaware. With modern computer technology, most advanced word processing programs have "desk-top publishing" capability, enabling users to generate and process very large volumes of text for which proofreading by the traditional word-by-word reading method is a lengthy and formidable task. Therefore, a spelling checker system is almost a necessary feature of such word processing programs for generating large text files.

A spelling checker is a program which runs typically in conjunction with a word processing program and includes a spelling dictionary that identifies the correct spellings of a collection of words. A few dictionaries are morphological in character, in that they apply a set of spelling rules to any given word to determine the correct spelling. However, most dictionaries are databases containing lists of correctly spelled words, and a spelling checker compares a given word in text with each word in the dictionary to verify the spelling. Of course, such spelling checkers are strictly limited by the size of the dictionary. The typical size of an English language dictionary for current word processor spelling checkers is approximately 100,000 words. By comparison, a current unabridged edition of Webster's Dictionary contains over a quarter million entries, and of course the Oxford dictionary of the English language is substantially larger.

Word processors normally provide the capability for a user to add words to a supplemental dictionary that is stored on the user's computer. In practical terms, this capability cannot fill the gap between the size of any typical main dictionary provided with the spelling checker system and an unabridged dictionary of the English language. Often, however, a given user tends to repeatedly use or encounter only a certain limited set of special or customized words and names in word processing text. For example, a person writing a novel may need a dictionary with the proper spelling of names of various characters in the story. Individuals doing word processing in large business organizations often need a dictionary with labels and names of various business products, as well as the names of other individuals in the organization. Technical writers in certain fields, such as electronics and computer technologies, are constantly encountering new words and acronyms that are continually being coined at a rate far too rapid to be included in any normal dictionary. In all of these instances the supplemental dictionary enables the user to build up a customized database of special words and to enhance the spelling checking process to include these words.

In an organizational environment, computers are generally connected together to form a local area network (LAN). It is often the case that the word processor users in such an environment generate supplemental dictionaries having many common entries, thus duplicating each others' efforts. Further, the spellings of commonly used words may vary between the local supplemental dictionaries created by different users because of spelling errors by individual users or ambiguities in the spelling of any given word. Clearly, in a LAN environment it is desirable to provide a commonly shared dictionary in which words can be entered by different users, with some means for verifying the spelling accuracy of the entries.

An attempt to provide such a shared dictionary is made in the network version of a word processing program produced by Frame Technology Corporation of San Jose, Calif., sold under the trademark "FRAMEMAKER®". This word processor gives each computer user in the network access to four different types of dictionaries for use in checking the spelling of text. The Main dictionary is provided by the vendor of the word processor (Frame Technology Corporation) and is a database which cannot be altered by any user. Each user also may have one or more Personal dictionaries, which contain words entered only by that user and may be modified by the user at any time. In addition, each document may have a Document dictionary, which can be modified by any user that is creating or editing that document.

Finally, this word processing system provides a Site dictionary which is accessible to all users in the LAN at a given site. The Site dictionary generally contains technical words and words that are commonly used at the site, such as the company name and product names. This Site dictionary thus fulfills some of the dictionary-sharing objectives which are useful in a network environment. However the Site dictionary in this word processor can only be altered by the user designated as the site administrator. If another user wishes to add, delete or change any word in the Site dictionary, the proposed modification must be communicated to the site administrator by means external to the word processing system, and all changes in the Site dictionary require that individual's personal attention. In this sense the Site dictionary is a supplemental dictionary only for the user who is the site administrator. Clearly it is desirable to provide a supplemental shared dictionary for word processing in a network environment with automated means for updating the dictionary based on information from all users in the network.

With the advent and increasing popularity of Internet computing, it is also desirable to provide a supplemental dictionary which is accessible over networks of very wide ranges. An automated updating feature for a shared dictionary encounters several problems in such an environment. Such a dictionary may be used simultaneously by thousands of users. With each user being allowed to modify the dictionary, the number of proposed modifications sent to the dictionary may become very large, and some means must be provided for organizing this volume of information. In particular, there may be spelling errors, conflicts and ambiguities in the proposed words received from a large population of users. Within a given language the population of users may speak various different dialects, and the correct spellings of many words may depend on the dialect of the user. Some system is required for resolving these problems and updating the dictionary in a controlled and accurate manner.

Finally, the expense of dictionary maintenance presents a special problem in the Internet context. In a LAN environment the cost of supporting a Site dictionary can be borne by the organization where the LAN is installed. However, on a wide range network a shared dictionary generally must be provided and maintained by some entity that is independent of most of the users of this dictionary. These maintenance services include sorting through the modifications that are proposed by users and selecting the spelling for those words that are being added to the dictionary. This selection process cannot be completely automated, and requires the efforts of personnel who are lexicographically skilled. A practical shared dictionary system must provide some means for equitable apportionment of the maintenance expenses, preferably including incentives for users to contribute new words and proposed modifications to the dictionary.

SUMMARY OF THE INVENTION

The computer dictionary system disclosed herein is based on a wide range network, such as the Internet, and is used in conjunction with the spelling checker of a word processing application to allow different network users to share a common customized supplemental dictionary. The dictionary system includes a vendor computer and one or more client computers, all of which communicate via the network. The preferred embodiments also include an automated method for updating the dictionary based on information provided by any of the users. Further, the system includes a method by which users can assist in maintaining and updating the shared dictionary by providing information such as new words and corrections or changes of dictionary entries.

The dictionary is furnished to users by a vendor, who may also be the vendor of the word processor and spelling checker application programs. Each client computer runs a word processing application with a spelling checker routine that references a database in local memory including a main dictionary and one or more custom dictionaries, similar to existing word processing systems such as the FRAME-MAKER® program described above. For each language supported by the vendor, the vendor computer memory contains a dictionary of approved words which is periodically released to individual users. Thus, each user's main dictionary corresponds to a released version of an approved dictionary from the vendor. When a user checks the spelling in a document and wishes to add a word to his local custom dictionary, the spelling checker provides the user with the option of communicating with the vendor to add the new word to the approved dictionaries in the vendor computer. In other words, each time users add new entries to their local custom dictionaries, they are given the opportunity to request the addition of these entries also to the vendor's global approved dictionaries (one for each supported language).

In a preferred embodiment, when the vendor computer receives an Internet message from a client computer suggesting the addition of a new word to the global dictionary, the vendor computer first checks to see if the language of the word is supported, and if so, then the computer further determines whether the word is already in the approved dictionary for that language. If the approved dictionary already contains the word, this is an indication that the user's main dictionary is outdated and the vendor computer sends an Internet message to the client computer relaying this fact and providing information about the availability and cost of a new upgrade for the local main dictionary. Periodically this information is displayed to the user, and the user is given the opportunity to upgrade the local main dictionary.

If the proposed new word is not found in the vendor dictionary of approved words, the vendor computer then checks whether the word is in a second dictionary of known misspellings of words in the corresponding language. This second dictionary is another database in the memory of the vendor computer, containing the aggregation of known misspellings together with suggested correct spellings for each misspelled word. If the proposed new word is found in this second dictionary, then the vendor computer conveys an Internet message to the client computer informing the user of the misspelling, together with the suggested correct spellings. This gives the user the opportunity to remove the misspelled word from the user's local custom dictionary.

In addition, the vendor computer memory also contains a third database of words for each supported language that have been requested by users for addition to the database of approved words, together with the number of times that each word in this database has been requested. When a given proposed new word does not appear in either the database of approved words or the database of misspelled words, then it is checked against the requested words in this third database. If it already exists in this database, then the number of request instances for the word is increased by one. Otherwise the word is added to this third database, and the number of request instances for the word is assigned the value unity.

Periodically the vendor scans the third database of requested words. This review is performed by a person with appropriate language skills, who reviews the database word by word. For each entry the person may transfer the word to the database of approved words, or he or she may move it to the database of misspelled words and enter one or more suggested correct spellings. Alternatively, the reviewer may leave the word in the third database and defer action until a succeeding review. After a certain number of these periodic reviews, the updated first database is made available to users as an upgraded release of the local main dictionary.

Finally, the system enables users to purchase upgrade releases of the main dictionary through Internet communication. Preferably the cost of the upgrade for a given user is discounted to reflect the volume of information provided by the user to the vendor, such as the number of words requested by the user that are incorporated into the approved dictionary. In short, the system provides incentives for the users to furnish spelling information to the vendor.

The foregoing advantages, characteristics and features of the invention may be better understood by examining the following drawings together with the detailed description of the preferred embodiments.

DETAILED DESCRIPTION OF THE PREFERRED EMBODIMENTS

Figure 1:
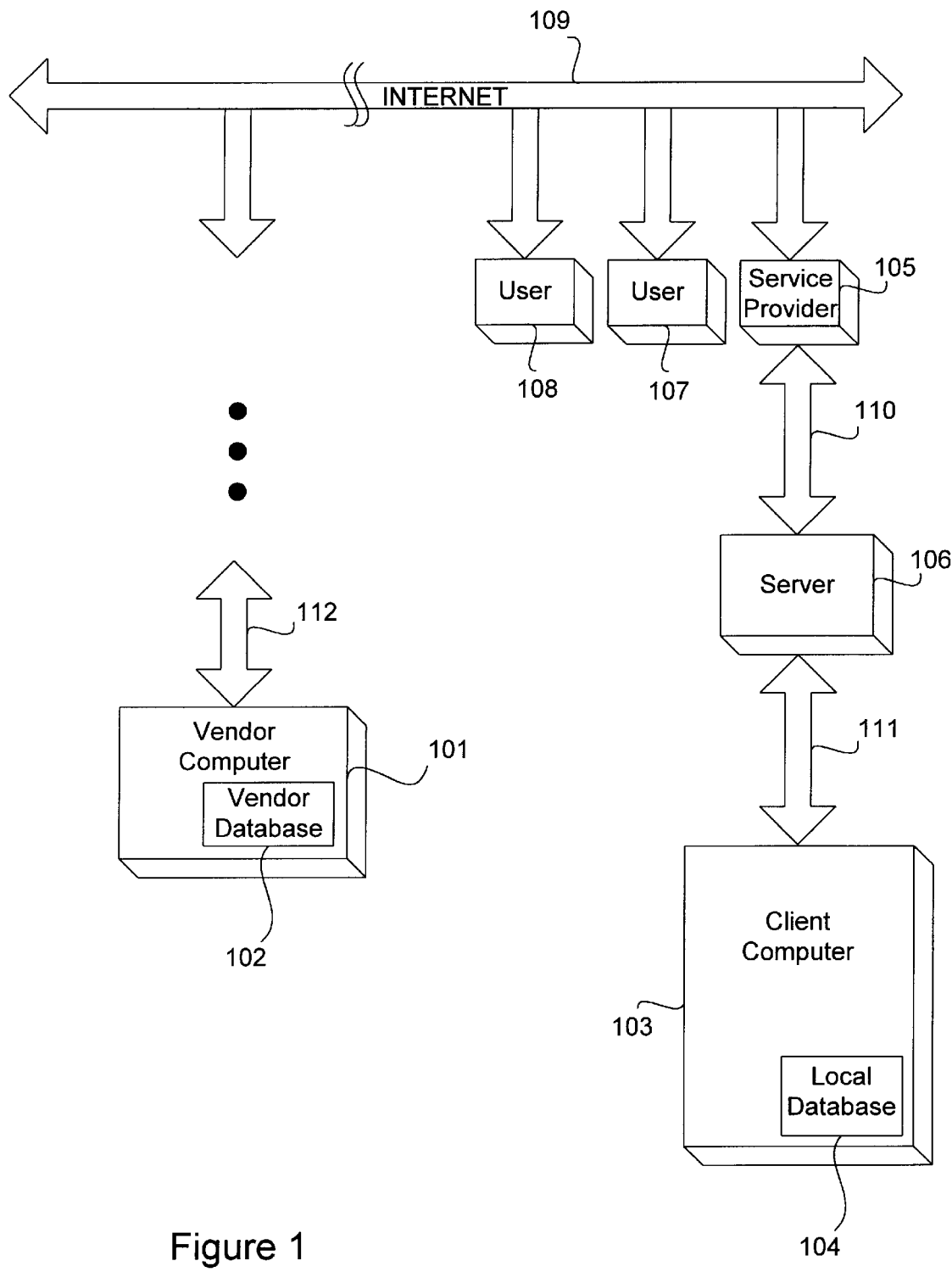
FIG. 1 is a schematic block diagram of an Internet-based computer network that includes the dictionary system of a preferred embodiment of the invention.

FIG. 1 is a schematic block diagram of a computer network that implements a preferred embodiment of the dictionary system. The network is constituted of a plurality of computers that communicate with each other by means of a wide range network communications mechanism, which in this embodiment is referred to as the "Internet" 109. In particular the network includes a vendor computer 101 that is operated by the vendor or supplier of the dictionary system. The vendor computer 101 has a communication channel 112 to the Internet 109. A typical user of the system operates a client computer 103 which is also linked to the Internet 109. This link can have a variety of configurations. In the example shown in FIG. 1, the client computer 103 is assumed to be part of a LAN and has a communication link 111 to a server 106, which in turn has a communication link 110 to an Internet service provider 105. The service provider 105 is thus the interface between the user's LAN and the Internet 109. In addition to the vendor computer 101 and the client computer 103, many other users are also connected to the Internet, two of which (107, 108) are shown in the diagram of FIG. 1.

Figure 2:
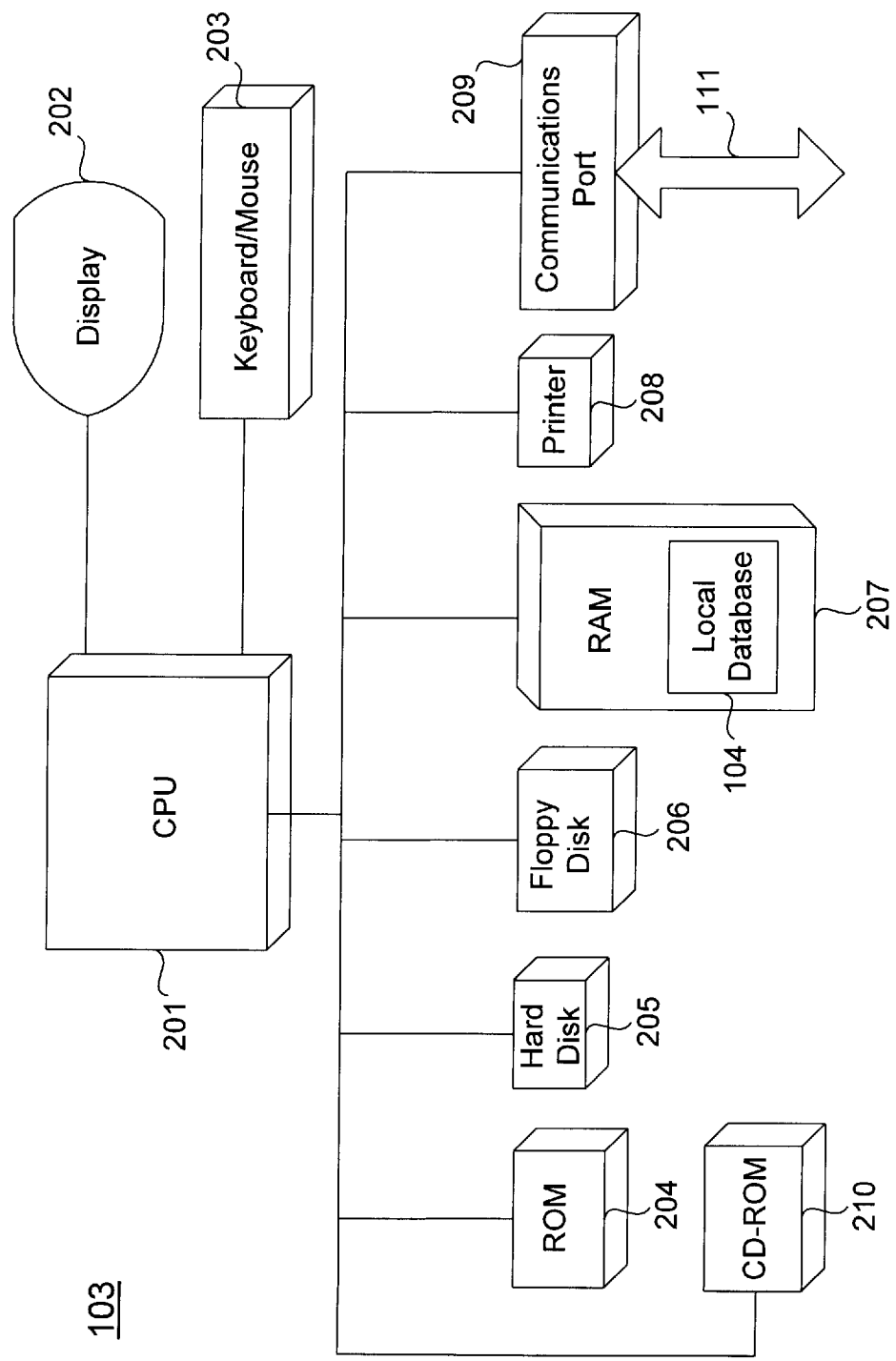
FIG. 2 is a schematic block diagram of the client computer that is shown as one of the elements in the network of FIG. 1.

The client computer 103 in FIG. 1 has a memory that contains a local database 104, as well as a word processing program and additional software that enables the computer 103 to operate the dictionary system. The general architecture of a typical client computer 103 is illustrated schematically in the block diagram of FIG. 2. The computer 103 includes a central processing unit (CPU) 201 connected to a display monitor 202 and a keyboard and mouse 203, or equivalent input means. The CPU 201 generally also communicates with various memory components including a random access memory (RAM) 207, read-only memory (ROM) 204, CD-ROM 210, hard disk 205, and one or more floppy disks 206. In addition a typical computer also has a printer 208 or other equivalent output means connected to the CPU 201. Finally, the client computer 103 includes a communications port 209 connected to the CPU 201 which enables the computer to send and receive information over the Internet via the communication channel 111.

Figure 3:
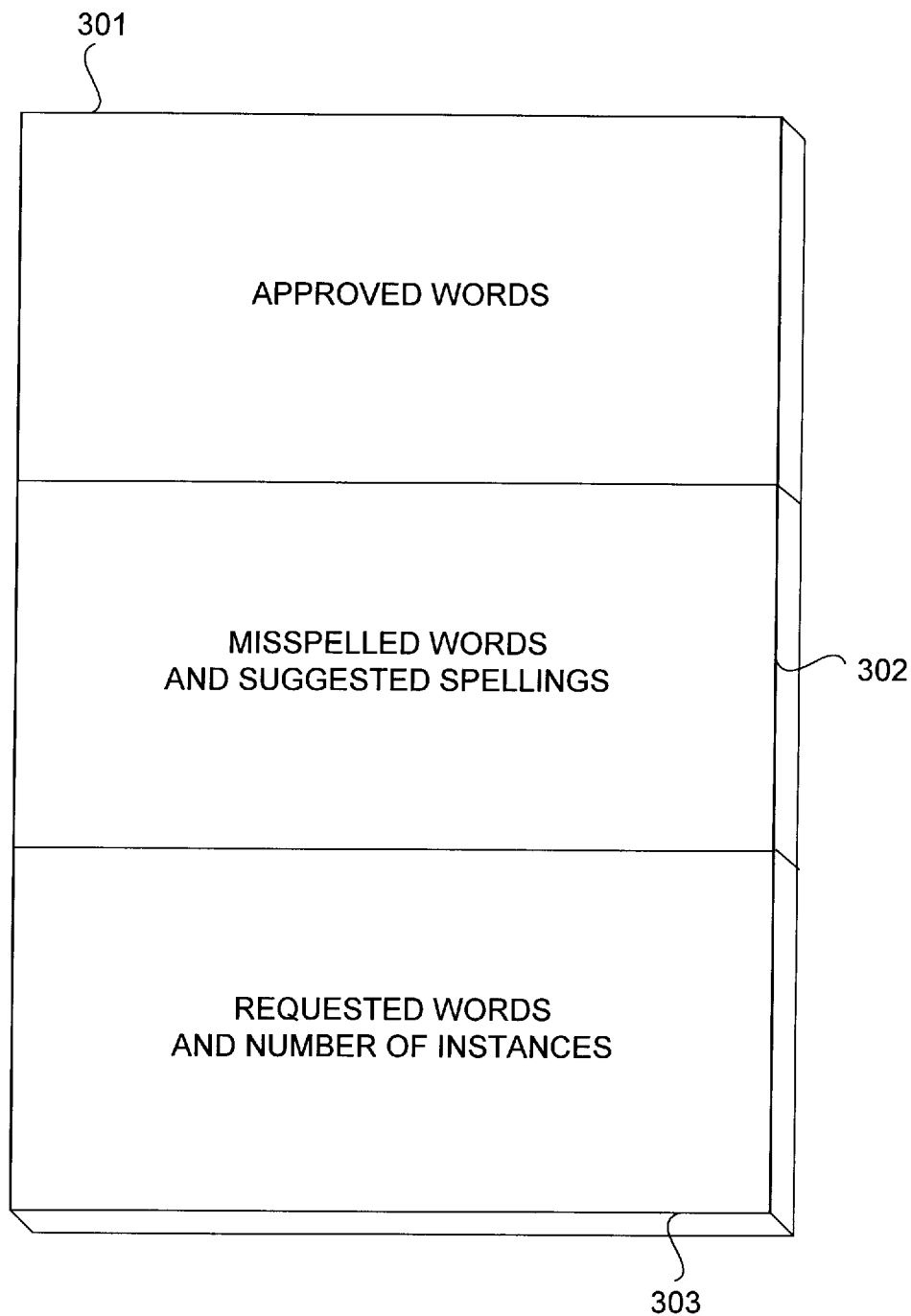
FIG. 3 is a schematic block diagram of the database contained in the vendor computer that is shown as one of the elements in the network of FIG. 1.

The client computer 103 is loaded with a word processing program that includes a spelling checker and associated main and supplemental dictionaries. This word processing program normally resides in RAM 207, and the associated main and supplemental dictionaries comprise a local database 104, also contained in RAM 207. The spelling checker routine of the word processing program includes client dictionary routines that enable the spelling checker to communicate with the vendor computer 101 via the Internet 109, and cause the client computer to operate the dictionary system of this invention. Thus the client computer 103 contains means for running programs in the Internet environment. Such means are preferably provided by the Java™ system, produced by Sun Microsystems, Inc., the assignee of the present invention. (The mark "JAVA", with the mixed case lettering shown above, is a trademark of Sun Microsystems, Inc. in the United States and foreign countries.) The architecture of the vendor computer 101 is typically similar to that of the client computer. The memory of the vendor computer 101 contains a vendor database 102 that includes the dictionaries maintained by the vendor in the system of the present invention. This database 102 is shown schematically in FIG. 3 in block diagram form. The database 102 constitutes a first dictionary 301 of approved words, a second dictionary 302 of misspelled words together with suggested alternative spellings for each of these words, and a third dictionary 303 of words that have been requested for addition to the first dictionary 301, together with an entry for each word of the number of times that the word has been requested. In addition, the memory of the vendor computer 101 contains vendor dictionary programs that cause the vendor computer to operate the dictionary system of this invention. Therefore the vendor computer 101 also contains means for running programs in the Internet environment.

Figure 4:
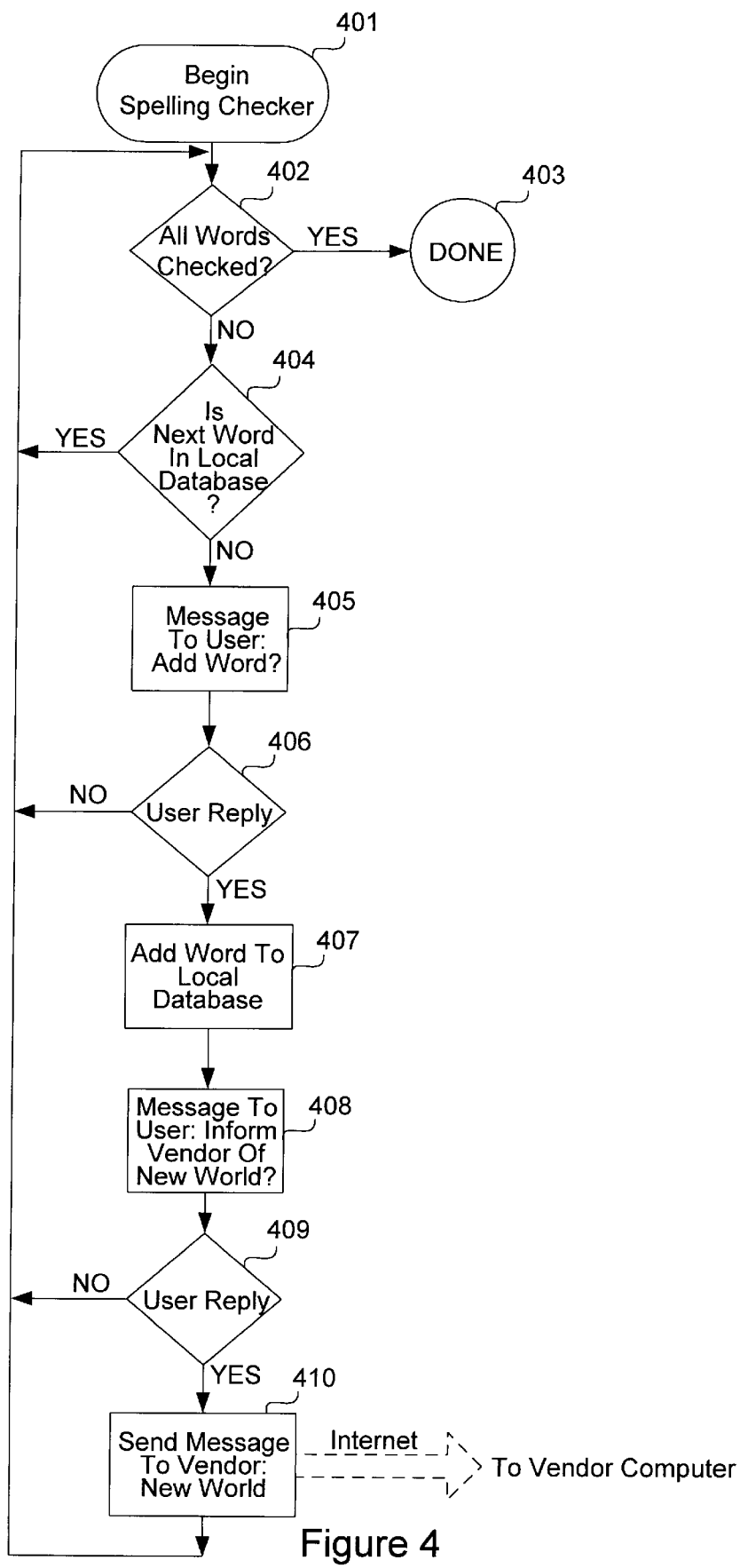
FIG. 4 is a flow chart illustrating the steps carried out by the spelling checker program in the client computer shown in FIGS. 1 and 2 during the operation of a preferred embodiment of the dictionary system.

Referring now to FIG. 4, a flow chart is presented showing schematically the procedure carried out by the spelling checker program adapted to the dictionary system of the present invention. This program is located in the memory 207 of the client computer 103, generally as part of the word processing application that is running on this computer 103. When the spelling checker program is initiated 401, the first step 402 in the procedure is to examine the text being processed to determine whether all of the words have been checked for spelling errors. If so, the procedure terminates 403. If there are more words to be checked, the next step 404 is to select the next word in the text and compare it with all words in the local database 104 of correctly spelled words. This database includes the main dictionary provided by the vendor and any supplemental dictionaries that are customized by the user. If the text word is found in the local database 104, then it is determined to be correctly spelled, and the program returns to step 402.

If the text word is not included in the local database 104, then it is either a misspelled word or a new word. The next step 405 in the procedure is to alert the user of this word. The program causes a message to be displayed on the monitor 202 and places the client computer 103 in a "waiting" state to receive a reply from the user via the keyboard or mouse 203, or other input means. This reply is received in the following step 406. The reply is a determination by the user that either the text word is misspelled, or else that it is a new word.

The precise manner in which this exchange of information with the user takes place depends on the system environment of the client computer 103. Messages and queries to the user may be simply displayed on the monitor screen 202, and the user may reply by pressing keys on the keyboard 203, or the monitor screen 202 may display a window with messages, queries, and buttons that are activated by a mouse 203, such as in a "windows" environment. These user/computer interface techniques are conventional, and the details of the techniques are omitted in the following description for purposes of simplicity.

Of course, if the text word is misspelled the spelling checker carries out a procedure for correcting this word. This procedure is not shown in the diagram of FIG. 4, since it is purely conventional and does not affect the operation of the present invention.

If the text word is not misspelled, then the message to the user at step 405 includes a query whether the new word should be added to the local dictionary 104. If the user reply is negative, the procedure returns to step 402. If the user elects to add this text word to the dictionary, this decision is executed in the next step 407. The program then sends another query to the user in step 408, giving the user the option of informing the vendor of the word that has been added to the local dictionary. The user reply is received in the next step 409. If the user declines, the procedure returns to step 402. If the user elects to inform the vendor, the next step 410 in the procedure is to send an Internet message notifying the vendor computer that the user has added the new word to the local dictionary, and requesting the addition of this word to the vendor database 102. The program then returns to step 402.

It will be recognized that the steps 408, 409, and 410 of the procedure illustrated in FIG. 4 include novel features of the spelling checker program that is resident on the client computer 103. The other steps illustrated in this drawing are typically carried out in conventional spelling checker and word processing programs. Thus the present invention provides an enhanced method for checking the spelling of word processing text.

A preferred technique for carrying out step 408 is to present a dialog box on the display 202 with the message:

Inform VendorName about this new word? Yes/No (1)

In this message the word "VendorName" is the name of the vendor, and the "Yes/No" portion is accompanied by buttons in the dialog box that enable the user to register a decision. The first time that this procedure is carried out the "Yes" button is activated by default, and in each subsequent iteration the default button is the one that was activated in the previous iteration. In other words, normally the vendor computer is notified when new words are added to the local dictionary, but the user is always given the opportunity to disable this notification, since a given new word may be confidential or embarrassing.

The step 410 of sending an Internet message to the vendor computer is preferably carried out as a background task on the client computer 103. If the computer 103 is controlled by a multithreaded operating system, step 410 is executed preferably as a background thread. The Internet communication with the vendor computer 101 may be carried out using the World Wide Web (WWW) system. In this embodiment, during step 410 the client computer sends an HTTP (hyper-text transfer protocol) "GET" message over the communication channel 111 to the web server for the vendor computer 101 with the following URL (universal resource locator):

http://www.vendorname.com/cgi-bin/newword?language+release+word (2)

In this URL, "vendorname.com" is the Internet address of the vendor computer 101, "cgi" (common gateway interface) and "bin" (binary) are parameters of the data transfer process, and "newword" is the name of the program that resides on the vendor computer 101 that enables this computer to respond to requests from the user to add a new word to the vendor database. That is, the above "GET" message causes the vendor computer to run the "newword" program. The identifiers "language", "release" and "word" are parameters for running this program. The "language" parameter is the vendor-designated identifier for the language that is being used by the word processor, such as "US-English", "UK-English", "Danish", and so forth. The "release" parameter identifies the version of the main dictionary that is being used currently on the client computer 103. Finally "word" is the new word that the user has added to the local database 104.

Figure 5:
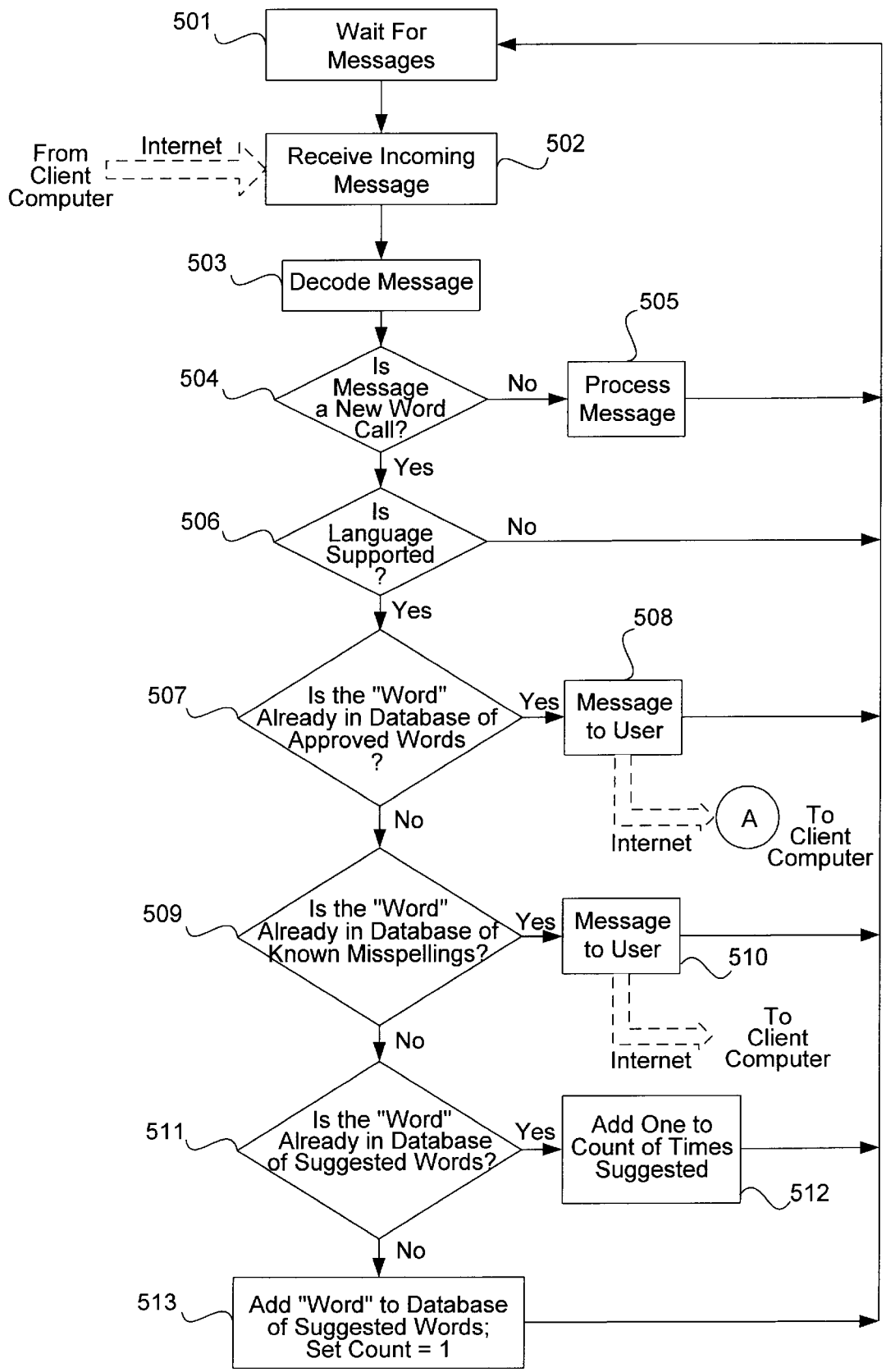
FIG. 5 is a flow chart illustrating the steps carried out by the program in the vendor computer shown in FIG. 1 in response to the Internet messages generated by the process illustrated in FIG. 4.

FIG. 5 is a flow chart showing the steps that are carried out by the "newword" program on the vendor computer 101. Initially the vendor computer is in a "ready" state 501 in which it is waiting for Internet messages from users. When the above-described message is sent by the client computer 103, it is communicated through the channel 112 to the vendor computer, and received in step 502. The message is decoded in step 503, and then tested in step 504 to determine whether it is a request to add a new word to the vendor database 102. If not, the message is processed in step 505, and the vendor computer returns to the "ready" state 501.

If the program determines that the incoming message is a request to add a new word to the database, the "language" parameter is tested in step 506 to determine whether the language is supported by the vendor database. If not, the computer returns to the "ready" state 501.

If the vendor database supports the language of the requested new word, the next step 507 is to test whether the requested word is already in the dictionary of approved words 301 contained in the vendor database 102. If so, the vendor computer proceeds to step 508, wherein an Internet message (labelled "A" in the drawing) is sent back to the client computer 103, and the vendor computer 101 returns to the "ready" state 501. This message "A" notifies the client computer that the requested word was found in the dictionary of approved words 301 in the vendor database 102. The message also identifies the most recent release of the dictionary of approved words for the language of the new word, and the cost of upgrading the user's main dictionary in the local database to this release, based on the "release" parameter specified in the request message received in step 502.

If it is determined in step 507 that the requested word is not contained in the dictionary 301 of approved words, the next step 509 is to test whether the requested word has been entered previously in the dictionary of misspelled words 302 contained in the vendor database 102. If so, the vendor computer proceeds to step 510, wherein an Internet message is sent back to the client computer 103, and the vendor computer 101 then returns to the "ready" state 501. This message notifies the client computer that the requested word appears to be misspelled, and also includes any suggested correct spellings that may be associated with the misspelled word in the dictionary 302.

When this misspelling message, generated in step 510, is received by the client computer 103, it is preferable to alert the user promptly to the fact that the word that was just entered in the user's supplemental custom dictionary is probably misspelled. This alert procedure is similar to the conventional procedure when the spelling checker detects a misspelled word, and therefore this alert procedure is not illustrated in the drawings. The alert procedure may display an alert box on the monitor 202, stating that the subject word was misspelled and presenting any available suggested correct spellings. The box may query the user whether to remove this word from the custom dictionary, and display an "OK" button and a "CANCEL" button to enable the user to reply by means of the mouse 203. If the user's reply is "OK", then the word is removed from the user's custom dictionary.

If step 509 determines that the subject word is not in the dictionary 302 of known misspellings, then the program diagrammed in FIG. 5 proceeds to the next step 511 to test whether the requested word already has been entered in the dictionary of words 303 that have been previously requested for addition to the database of approved words 301, contained in the vendor database 102. If so, the vendor computer proceeds to step 512, and adds one to the count of the number of times that the word has been requested. If the word has not been requested previously, then the program executes step 513 by entering the word into the dictionary 303 and setting the count of the number of request instances to one for the word. After either step 512 or 513, the program returns the vendor computer 101 to the "ready" state 501.

Figure 6:
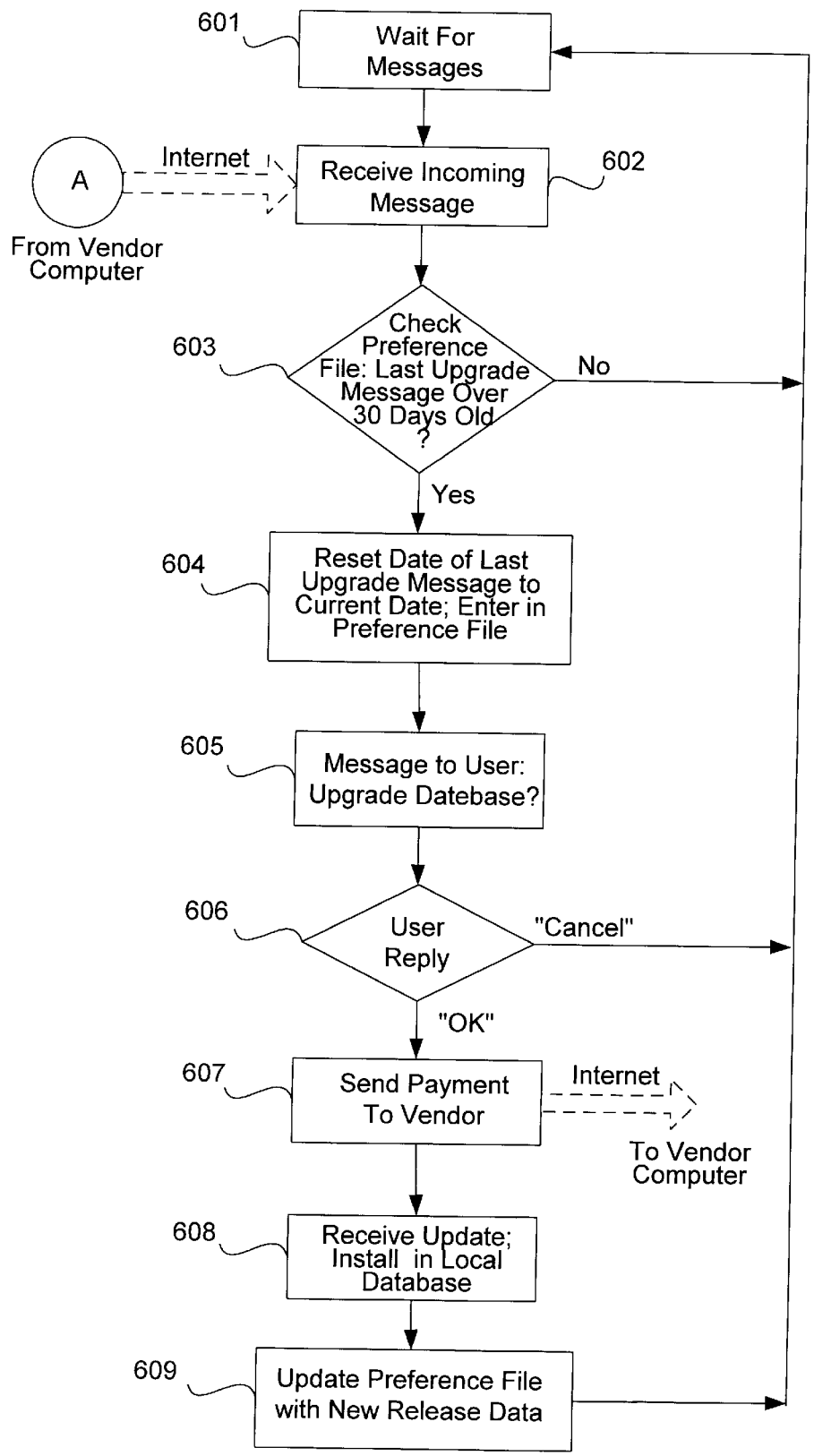
FIG. 6 is a flow chart illustrating the steps carried out by the program in the client computer shown in FIGS. 1 and 2 in response to the Internet messages generated by the process illustrated in FIG. 5.

FIG. 6 shows a diagram of a flow chart which illustrates the operation of a second client dictionary program that is stored and runs in the client computer 103. If the client computer is controlled by a multithreaded operating system, this second dictionary program is also preferably executed as a background thread. This program responds to the messages, designated "A" in FIG. 5, that are sent over the Internet by the vendor computer 101 when the "newword" program in the vendor computer determines that a requested word is already in the dictionary of approved words 301. It is preferable that the user not be alerted every time an "A"-type message arrives, since every addition of a new word in the user's local database 104 could result in the generation of an "A"-type message (this would occur if each new word were already included in the approved dictionary 301 contained in the vendor database 102).

For this reason, the memory 207 of the client computer also contains a preference file, which stores the date of the last notification to the user in response to an "A"-type message. This date is used for comparison with the date of any incoming message, and the program ensures that the user is not bothered by incoming upgrade alerts more often than a certain frequency, which is typically once every 30 days. The preference file also contains the date and release number of the last upgrade from the vendor that has been loaded into the main dictionary in the client computer 103.

Initially the client computer 103 in the background thread is in a "ready" state 601, where it is waiting for incoming messages from the Internet. When an "A"-type message arrives through the Internet channel 111, the computer 103 receives and decodes this message in step 602. In the next program step 603, the preference file is accessed to determine the date on which the last upgrade alert was displayed to the user. If the interval between the date of the last alert and the current date is less than a certain period of time (30 days in the embodiment illustrated in the drawing), the "A"-type message is discarded and the client computer 103 returns to the "ready" state 601.

If the last upgrade alert is more than 30 days old, the program proceeds to step 604, in which the date of the last alert in the preference file is reset to the current date. Next, in step 605 the client computer 103 displays a dialog box on the monitor 202, with a message informing the user that a new upgrade to the user's main dictionary is available and may be downloaded at a specified price. The dialog box has buttons labelled "OK" and "CANCEL" to enable the user to reply by means of the mouse or keyboard 203.

The user's reply is received in step 606. If the user clicks on the "CANCEL" button, the client computer returns to the "ready" state 601. If the user responds with an "OK" message, the program proceeds to step 607, which in the illustrated embodiment is a payment of the upgrade price from the user to the vendor by means of Internet communication between the client computer 103 and the vendor computer 101. This payment can be effected in several ways. One method is to send an encrypted message of the user's credit card number over the Internet from the client computer to the vendor computer and treat the payment as a credit card charge. A preferable technique which offers greater security is available under the "First Virtual Internet Payment System", maintained by First Virtual Holdings, Inc. This system is described and is accessible over the Internet through "info@fv.com" and also over the World Wide Web through the URL:

$$\text{http://www.fv.com} \tag{3}$$

These payment methods are known to persons skilled in the relevant art. Also, the dialog box and mouse technique of steps 605 and 606 may be replaced by other methods for communicating with the user known to persons of reasonable skill in the art.

Upon receipt of the upgrade payment, the vendor computer returns the dictionary upgrade containing the additional approved words over the Internet, and this upgrade is downloaded in step 608 of FIG. 6. In this step the client computer 103 adds the new approved words to the main dictionary in the local database 104, and also removes these words from the local customized supplementary dictionary if they are there. Finally, in step 609 the program updates the information in the preference file to indicate the date and release number of the new dictionary upgrade, and control of the computer is then returned to the "ready" state 601.

Figure 7:
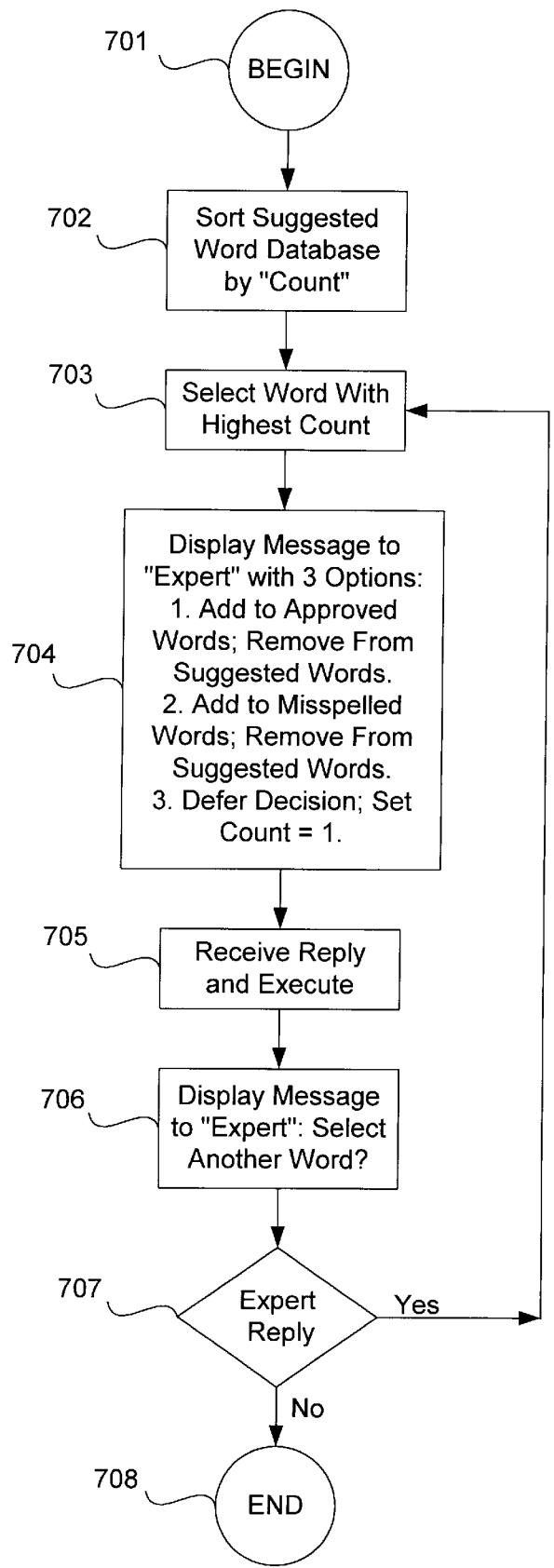
FIG. 7 is a flow chart illustrating the steps carried out by the program in the vendor computer shown in FIG. 1 in performing an upgrade of the dictionary system in one embodiment.

The upgrading of the dictionary 301 of approved words in the vendor database 102 requires periodic and regular reviews of the requested words in the database of requested words 303. These reviews are carried out at regular intervals, preferably at least once per month, by a person having lexicographic and orthographic skills and training, referred to here as an "expert". Each review is performed using a second vendor dictionary program running on the vendor computer 101. This program is illustrated schematically in the flow chart shown in FIG. 7.

The program is initiated at the outset of the review in step 701. In step 702, the entries in the database 303 of requested words are arranged in a priority list, i.e. a file in memory, ranked by the number of requests for each word, or "request count". The word with the highest request count is given highest priority. This word is selected for review in step 703 of the program.

The vendor computer 101 has a monitor display and keyboard/mouse input means similar to the client computer 103. In the next program step 704, the selected word is displayed on the vendor computer monitor for viewing by the expert. The monitor also displays a dialog box in which the expert is given three choices for the selected word:

1. Add the selected word to the database of approved words (301) and remove the selected word from the list of suggested words (303).
2. Add the selected word to the database of misspelled words (302) and remove the selected word from the list of suggested words (303).
3. Defer any decision regarding the word and reset the request count to 1.

It will be appreciated that choice number 3 has the effect of displacing the word to the bottom of the priority list. Upon commencement of subsequent review sessions, unless a sufficient number of new requests for that word have been received from users, the word will not be reviewed again until all other words in the database 303 have been reviewed.

The dialog box also contains buttons, check boxes or other selection mechanisms to enable the expert to choose one of the above three options with the vendor computer keyboard or mouse. When this choice has been made, the program proceeds to step 705 which receives and executes the expert's reply.

In the next program step 706, another dialog box is presented on the vendor computer display monitor with the query: "Select another word?" The dialog box also contains buttons for two choices, labelled "YES" and "NO", which can be selected by the expert using the vendor computer keyboard or mouse.

When the expert has replied, the program proceeds to step 707 in which this reply is received by the vendor computer. If the expert chooses to select another word, the program returns to step 703, and the next highest word on the list is selected for review. If the expert chooses "NO", then the program reaches its termination point 708. Thus the expert can terminate the review session after any given number of words have been reviewed.

After a certain number of these review sessions, or alternatively after a given number of new words have been added to the database of approved words 301, the updated database 301 can be made available to users as a new upgrade release. As previously described, users who request the addition of words to the dictionary which in fact are already included in this database are automatically notified of this availability, subject to the limitation on the frequency of such notifications. In addition it is desirable to notify periodically all of the other customers of this availability, since there may be many users who do not request the addition of new words to the vendor database 102, either because they do not elect to add words to their local supplemental dictionaries (step 406) or because they elect to override the default choice in step 409 and do not inform the vendor of new words that they have added to their local supplemental dictionaries.

Therefore the vendor computer memory preferably contains a customer database, which comprises a list of registered customers including, for each customer, (a) the customer's e-mail address, (b) the minimum time interval between notifications of upgrade releases for the customer, (c) the date of the last notification to the customer, and (d) the languages used by the customer. The vendor computer updates the information in field (c) each time the customer is sent a notification of the availability of a new upgrade release. The information in the other fields is supplied by each customer upon registration. The registration process is carried out in some conventional manner, such as by having customers fill out postcards or requesting that they enter information through the Internet on the vendor's website.

It is also desirable to encourage users to participate in providing information that is used to maintain the dictionary, and to request the addition of new words whenever possible. Therefore the system preferably includes a process or mechanism for accounting for the number of words that each user has added. This mechanism may be the inclusion in the above-described customer database of another field: (e) the number of words contributed by the customer that were added to the dictionary of approved words 301. Periodically the system polls the number entered in this field (e) and the value in this field is reset to zero for each user. The data from this field may be utilized to compensate each customer, either by a direct payment, or preferably by a discounted upgrade price, in proportion to the information contributed by that customer.

The dictionary system may be implemented in any wide range computer network. However, it will be appreciated that the use of the Internet provides a particular advantage in the maintenance of the dictionary, in that a very large number of users may participate in providing information. Since it is unlikely that any user will request the addition of a given word to the dictionary more than once, the priority list of requested words essentially ranks each word according to the number of persons who use that word sufficiently to request its inclusion in the dictionary. The dictionary maintenance process is thus guided by the current usage of words, and the extent of this guidance is improved as the number of participating users increases. The Internet therefore facilitates the dictionary maintenance process by giving the dictionary vendor greater access to contemporary usage of the language. This is a desirable objective for all dictionary vendors. The advantages of the present system are especially significant for the English language, which is evolving very fast and for which ever larger portions of the written literature are being created by means of word processors.

The above system has been described in terms of its relationship to a word processor. However the invention is not limited to this context. The dictionary system, and spelling checkers in general, are useful in other computer applications where it is desirable to check the spelling of some text, such as electronic mail handling programs and presentation systems.

The computer programs and databases for the system described above reside in memory components of the computers in the network. In other embodiments, these programs and data are contained in other information storage devices, and are loaded into the various computers for use. For example, the programs, dictionaries and other databases may be stored on compact disks and loaded into the CD-ROM for each computer, such as the CD-ROM 210 shown in FIG. 2.

The foregoing description of the preferred embodiments of the invention has been presented for purposes of illustration and description, and is not intended to be exhaustive or to limit the invention to the precise forms disclosed. Many modifications and variations of the invention are possible in light of the above teaching. It is intended that the spirit and scope of the invention are to be defined by reference to the following claims, along with their full scope of equivalents.

What is claimed is:

1. A dictionary system for spelling checkers and word processing applications, said dictionary system comprising:
   a first computer comprising:
      a first display mechanism:
      a first input mechanism:
      a first port mechanism for exchanging information between said first computer and other computers; and
      a first memory containing a spelling checking program for checking the spelling in computer text being processed by said first computer, and further containing a first database of words for use with said spelling checking program, such that said spelling checking program causes said first computer to compare a word in computer text with words in said first database, and enables a user to add said word to said first database by means of said first display mechanism and first input mechanism, and further causes said first computer to transmit said word through a communication mechanism to a second computer:
   said second computer comprising:
      a second port mechanism for exchanging information between said second computer and other computers; and
      a second memory-containing a second database of words, and further containing a dictionary program which causes said second computer to receive said word transmitted from said first computer, and to compare said word with words in said second database, and enables said user to request the addition of said word to said second database by means of said first display mechanism and first input mechanism; and said communication mechanism communicative with said first port mechanism and said second port mechanism, for exchanging information between said first computer and said second computer;

wherein said first database comprises a main dictionary and a supplemental dictionary, such that, following said comparison of said word in computer text with words in said main dictionary and said supplemental dictionary, if said word is not contained in said dictionaries, said spelling checking program causes said first computer to exhibit said word by means of said first display mechanism and enables said user to add said word to said supplemental dictionary by means of said first input mechanism, and to transmit said added word to said second computer.

2. A dictionary system as recited in claim 1, wherein said second database comprises a first dictionary of correctly spelled words and a second dictionary of misspelled words, such that, said dictionary program causes said second computer to compare said transmitted added word with words in said first dictionary and determine if said word is contained in said first dictionary.

3. A dictionary system as recited in claim 2, such that if said word is not contained in said first dictionary, said dictionary program causes said second computer to compare said word with words in said second dictionary, and if said word is contained in said second dictionary, said dictionary program further causes said second computer to send information to said first computer indicating that said word is misspelled.

4. A dictionary system as recited in claim 2, wherein said second database further comprises a third dictionary of words that are requested for addition to said first dictionary, such that, following said second computer receiving said added word, if said word is not contained in said first and second dictionaries, said dictionary program causes said second computer to add said word to said third dictionary.

5. A dictionary system as recited in claim 4, wherein said third dictionary further contains, for each of said requested words, a variable indicating the number of requests for said word, and wherein said dictionary program, upon each addition of a word which is already contained in said third dictionary, changes the value of said variable, and upon each addition of a word which is not already contained in said third dictionary, sets said variable to the value corresponding to one request.

6. A dictionary system as recited in claim 4, wherein said second computer further comprises:
   a second display mechanism; and
   a second input mechanism;
and wherein said dictionary program further causes said second computer to exhibit each of said words in said third dictionary by means of said second display mechanism and enables a second user of said second computer to transfer any of said words to said first dictionary or second dictionary from said third dictionary by means of said second input mechanism.

7. A dictionary system as recited in claim 6, wherein said third dictionary further contains, for each of said requested words, a variable indicating the number of requests for said word, and wherein said dictionary program further enables a second user of said second computer to retain said word in said third dictionary, and upon such retention sets said variable to the value corresponding to one request.

8. A dictionary system as recited in claim 4, wherein prior to adding said word to said third dictionary, said dictionary program causes said second computer to transmit to said first computer information that said word is not in said first and second dictionaries, and further, wherein said spelling checking program displays said information by means of said first display and enables said user to request the addition to said third dictionary of said word by means of said first input mechanism, and transmits said request to said second computer.

9. A dictionary system as recited in claim 2, such that upon said comparison, if said word is contained in said first dictionary, said dictionary program causes said second computer to transmit to said first computer information regarding said first dictionary.

10. A dictionary system as recited in claim 1, wherein said second computer further comprises:
   a second display mechanism; and
   a second input mechanism;
and wherein said dictionary program further causes said second computer to exhibit on said second display mechanism each of said words requested by said user for addition to said second database, and enables a second user of said second computer to transfer any of said words to said second database by means of said second input mechanism.

11. A dictionary system as recited in claim 1, wherein said communication mechanism comprises a wide area network communication mechanism.

12. A dictionary system as recited in claim 1, further comprising a plurality of additional computers, each of said additional computers comprising:
   an additional memory;
   an additional display mechanism;
   an additional input mechanism; and
   an additional port mechanism for exchanging information between said additional computer and other computers;
   wherein said communication mechanism communicative with said first port mechanism and said second port mechanism is also communicative with said additional port mechanism, for exchanging information between said additional computer and said second computer; and
   wherein said additional memory contains the spelling checking program that is contained in said first computer for checking the spelling in computer text being processed by said additional computer, and further contains an additional database of words for use with said spelling checking program, such that said spelling checking program causes said additional computer to perform the same functions using said additional database as the spelling checking program functions in said first computer with said first database.

13. A dictionary system as recited in claim 12, wherein said second memory further contains a database of information regarding users of said first computer and said additional computers, and wherein said dictionary program causes said second computer to transmit to said first computer and said additional computers information regarding changes of said first dictionary in said second computer.

14. A dictionary system as recited in claim 12, wherein said second memory further contains a database of information regarding users of said first computer and said additional computers, said database comprising, for each of said users, the number of times that such user has requested the addition of a word to said first dictionary that was added to said first dictionary.

15. A dictionary system as recited in claim 14, wherein said dictionary program includes a method to compensate each user according to said number of times that such user has requested the addition of a word to said first dictionary that was added to said first dictionary.

16. In a dictionary system for spelling checkers and word processing applications, said dictionary system having a first computer including a first memory containing a first database of words, said dictionary system also having a second computer including a second memory containing a second database of words, said second database having a first dictionary of approved words, a second dictionary of misspelled words, and a third dictionary of words requested for addition to said first dictionary and said dictionary system further having a communication mechanism for exchanging information between said first computer and said second computer:

a method for checking the spelling of a word in computer text being processed by said first computer, said method comprising:

adding said word to said first database;

enabling a user of said first computer to request addition of said word to said second database;

upon such request, transmitting said word through said communication mechanism to said second computer;

receiving said word in said second computer;

determining whether said word is already in said first dictionary;

if said word is not in said first dictionary, determining whether said word is already in said second dictionary; and if said word is not in said second dictionary, adding said word to said third dictionary.

17. The method recited in claim 16, further comprising, following the step of determining that said word is already in said first dictionary, the steps of:

transmitting to said first computer upgrade information regarding said first dictionary;

enabling a user of said first computer to request an upgraded copy of said first dictionary and transmit said request to said second computer through said communication mechanism; and following receipt of said request by said second computer, transmitting said upgraded copy of said first dictionary to said first computer through said communication mechanism.

18. The method recited in claim 16, further comprising, following the step of determining that said word is already in said second dictionary, the steps of:

transmitting to said first computer information regarding misspelling of said word and suggested correct spellings of said word; and enabling a user of said first computer to correct the spelling of said word in said first database.

19. The method recited in claim 16, wherein said third dictionary further contains, for each of said requested words, a variable indicating the number of requests for said word, further comprising:

prior to the step of adding said word to said third dictionary, the step of determining whether said word is already included in said third dictionary, and if so, modifying the value of said variable to correspond to the number of requests for said word increased by one; and following the step of adding said word to said third dictionary, the step of modifying the value of said variable to correspond to one request for said word in said third dictionary.

20. A computer readable storage medium containing encoded data for use in a dictionary system for spelling checkers and word processing applications, said dictionary system having a first computer including a first memory containing a first database of words, said dictionary system also having a second computer including a second memory containing a second database of words, and said dictionary system further having a communication mechanism for exchanging information between said first computer and said second computer, said data comprising a program for causing said first computer to perform a method for checking the spelling of a word in computer text being processed by said first computer, said method including the step of adding said word to said first database, said second database further including a first dictionary of approved words, a second dictionary of misspelled words, and a third dictionary of words requested for addition to said first dictionary, said method further comprising, after said step of adding said word to said first database, the steps of:

enabling a user of said first computer to request addition of said word to said second database; and upon such request, transmitting said word through said communication mechanism to said second computer;

receiving said word in said second computer;

determining whether said word is already in said first dictionary;

if said word is not in said first dictionary, determining whether said word is already in said second dictionary; and if said word is not in said second dictionary, adding said word to said third dictionary.

21. A computer readable storage medium as recited in claim 20, said method further comprising, following the step of determining that said word is already in said first dictionary, the steps of:

transmitting to said first computer upgrade information regarding said first dictionary;

enabling a user of said first computer to request an upgraded copy of said first dictionary and transmit said request to said second computer through said communication mechanism; and following receipt of said request by said second computer, transmitting said upgraded copy of said first dictionary to said first computer through said communication mechanism.

22. A computer readable storage medium as recited in claim 20, said method further comprising, following the step of determining that said word is already in said second dictionary, the steps of:

transmitting to said first computer information regarding misspelling of said word and suggested correct spellings of said word; and enabling a user of said first computer to correct the spelling of said word in said first database.

23. A computer readable storage medium as recited in claim 20, wherein said third dictionary further contains, for each of said requested words, a variable indicating the number of requests for said word, said methods further comprising the steps of:

prior to the step of adding said word to said third dictionary, the step of determining whether said word is already included in said third dictionary, and if so, modifying the value of said variable to correspond to the number of requests for said word increased by one; and following the step of adding said word to said third dictionary, the step of modifying the value of said variable to correspond to one request for said word in said third dictionary.

24. A dictionary system for spelling checkers and word processing applications, said dictionary system comprising: a first computer, the first computer having a first port mechanism for exchanging information between said first computer and other computers through a communication mechanism, wherein said first computer implements a spelling checking program, for checking the spelling of a word entered into said first computer, and a first database of words for use with said spelling checking program for checking the spelling of said word, and a user is enabled to enter said word into the first database such that when said word is entered into said first database said word is transmitted through the first port mechanism and the communication mechanism to a second computer system for further analysis regarding the spelling of said word;

wherein the first database includes a main dictionary and a supplemental dictionary, such that, when the first computer compares the word with the first database the first computer compares the word with words in the main dictionary and the supplemental dictionary, and if the word is not contained in the main or supplemental dictionaries the first computer informs the user and enables the user to add the word to the supplemental dictionary, and the first computer also enables the user to transmit the word to the second computer for further analysis regarding the spelling of said word.

25. A dictionary system for spelling checkers and word processing applications, said dictionary system comprising: a first computer, the first computer having a first port mechanism for exchanging information between said first computer and other computers through a communication mechanism, wherein said first computer implements a dictionary program and a database which enables said first computer to receive a word and an instruction from a second computer, and the dictionary program enables the first computer to add the word into the database if the instruction requests the addition of the word to the database;

wherein the database includes a first dictionary of correctly spelled words and a second dictionary of misspelled words, such that, when the dictionary program receives the word and the instruction from the second computer requesting the addition of the word into the database the first computer determines if the word is contained in the first dictionary, and when the dictionary program receives the word and the instruction from the second computer requesting the addition of the word into the database and the word is not included in the first dictionary of correctly spelled words the first computer determines if the word is contained in the second dictionary of misspelled words, and if the first computer determines that the word is contained in the second dictionary of misspelled words the first computer transmits a message to the second computer indicating that the word is misspelled.

26. A dictionary system for spelling checkers and word processing applications, said dictionary system comprising: a first computer, the first computer having a first port mechanism for exchanging information between said first computer and other computers through a communication mechanism, wherein said first computer implements a dictionary program and a database which enables said first computer to receive a word and an instruction from a second computer, and the dictionary program enables the first computer to add the word into the database if the instruction requests the addition of the word to the database;

wherein the database includes a first dictionary of correctly spelled words and a second dictionary of misspelled words, such that, when the dictionary program receives the word and the instruction from the second computer requesting the addition of the word into the database the first computer determines if the word is contained in the first dictionary, and when the dictionary program receives the word and the instruction from the second computer requesting the addition of the word into the database and the word is not included in the first dictionary of correctly spelled words the first computer determines if the word is contained in the second dictionary of misspelled words, and the database further includes a third dictionary of words that are requested for addition to the first dictionary, such that, if the first computer determines that the word is not contained in the first dictionary of correctly spelled words and not contained in the second dictionary of misspelled words the first computer adds the word into the third dictionary.

27. A dictionary system for spelling checkers and word processing applications, said dictionary system comprising: a first computer, the first computer having a first port mechanism for exchanging information between said first computer and other computers through a communication mechanism, wherein said first computer implements a dictionary program and a database which enables said first computer to receive a word and an instruction from a second computer, and the dictionary program enables the first computer to add the word into the database if the instruction requests the addition of the word to the database;

wherein the database includes a first dictionary of correctly spelled words and a second dictionary of misspelled words, such that, when the dictionary program receives the word and the instruction from the second computer requesting the addition of the word into the database the first computer determines if the word is contained in the first dictionary, and when the dictionary program receives the word and the instruction from the second computer requesting the addition of the word into the database and the word is not included in the first dictionary of correctly spelled words the first computer determines if the word is contained in the second dictionary of misspelled words, and the database further includes a third dictionary of words that are requested for addition to the first dictionary, such that, if the first computer determines that the word is not contained in the first dictionary of correctly spelled words and not contained in the second dictionary of misspelled words the first computer transmits a message to the second computer, the message requesting permission to add the word into the third dictionary.

28. A dictionary system as recited in claim 27, wherein the third dictionary of words includes, a plurality of words that have been requested for addition to the first dictionary and a variable for each of the plurality of words, where the variable indicates the number of requests for the each word, such that, when permission is received from the second computer the word is added to the third dictionary and the variable associated with the word is set to a value corresponding to one request.

29. A dictionary system as recited in claim 28, wherein if the word is already contained in the dictionary the variable associated with the word is incremented.

30. A dictionary system as recited in claim 28, wherein the first computer enables a user to transfer any of the plurality of words contained in the third dictionary to the first or the second dictionary.

31. A dictionary system as recited in claim 28, wherein the first computer enables a user to retain any of the plurality of words, contained in the third dictionary, in the third dictionary.

32. A dictionary system as recited in claim 31, wherein the first computer enables the user to retain any of the plurality of words, contained in the third dictionary, in the third dictionary and setting any of the variables associated with the retained words to the value corresponding to one request.

33. A dictionary system as recited in claim 30, wherein if any of the plurality of words contained in the third dictionary is transferred to the first dictionary, the first computer transmits a second message to the second computer, the second message informing the second computer that the first dictionary has been updated and the updated first dictionary is available to the second computer.

34. A dictionary system as recited in claim 33, wherein the first computer transmits the updated first dictionary upon receiving a request to transmit the first dictionary from the second computer.

35. A method of updating a dictionary system, the dictionary system including a first computer having a first database of words, and a second computer having a second database of words, the first and second computers being in communication with each other through a communication mechanism, the method comprising:

said second computer receiving from the first computer a word and information regarding spelling of said word;

said second computer determining if said word is included in said second database;

wherein the second database includes a first dictionary of approved words, a second dictionary of misspelled words, and a third dictionary of words requested for addition to said first dictionary, such that the process of said second computer determining if said word is included in said second database includes:

determining if said word is in said first dictionary; and if said word is not in said first dictionary, said second computer transmitting to said first computer said word, including information regarding the spelling of said word.

36. A method as recited in claim 35, further comprising:

if said word is in said first dictionary, said second computer transmitting to said first computer said word, including information regarding the spelling of said word.

37. A method as recited in claim 35, wherein said information regarding the spelling of said word comprises information regarding upgrading the first dictionary, the method further comprising:

said second computer receiving a message from said first computer, through said communication mechanism, the message assenting to the upgrading of the first dictionary by the second computer and said second computer upgrading the first dictionary; and transmitting an upgraded first dictionary to said first computer through said communication mechanism.

* * * * *